Oct. 8, 1929.  E. N. WHITMIRE  1,730,907
CUTTER
Filed Sept. 26, 1928
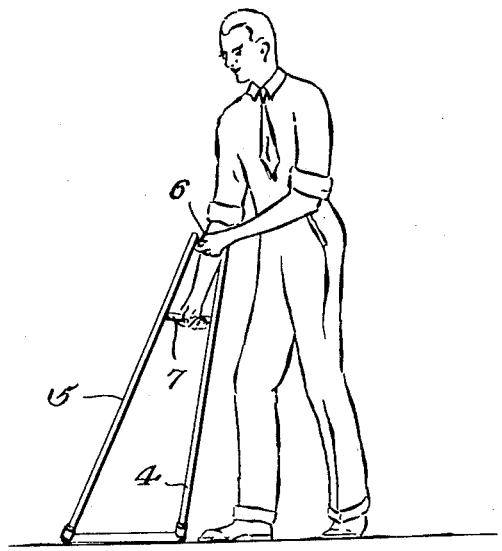
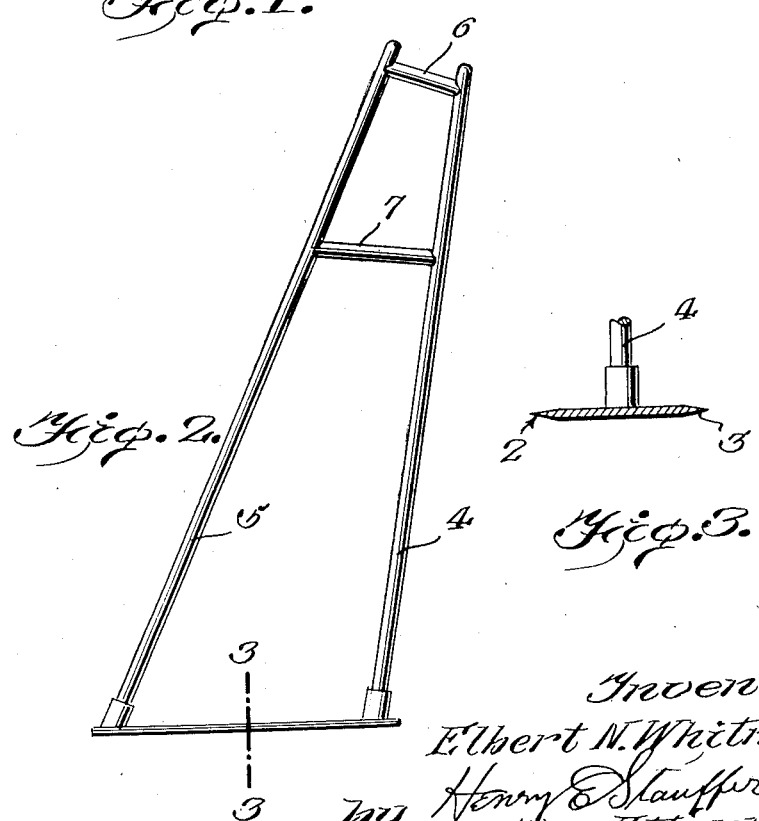

Patented Oct. 8, 1929

1,730,907

UNITED STATES PATENT OFFICE

ELBERT N. WHITMIRE, OF WALHALLA, SOUTH CAROLINA

CUTTER

Application filed September 26, 1928. Serial No. 308,376.

My invention relates to cutters, and particularly to that class or such implements as are primarily designed for use in the cutting of grass, weeds and other vegetation.

The objects of the invention are to produce an implement of this type which is rugged in construction and easy to operate, and which shall normally assume in the hands of the operator the proper cutting position, both with respect to the ground and the vegetation to be cut.

In the accompanying drawing:

Fig. 1, is a view of the invention illustrating the manner of its use;

Fig. 2, is a perspective view of the implement on a larger scale than it appears in Fig. 1;

Fig. 3, is a cross-section taken through the blade.

Referring to the drawing, the blade of the cutter is represented by the numeral 1. This blade may be sharpened on either one or both of its edges 2 and 3, and in the form here shown is sharpened on both edges. Rigidly attached to and supporting the blade are two bars 4 and 5. These bars are secured one to either end of the blade in such a manner that they form an angle with respect thereto, both bars extending in the same general direction. In the preferred arrangement, the bar 5 forms a more acute angle with respect to the blade than does the bar 4, thus causing the upper ends of the bars to approach each other. These bars have secured thereto, at or near the upper ends thereof, connecting bars or handles 6 and 7. The bars 6 and 7 are so joined to the bars 4 and 5 as to be in proper position to be easily grasped by the hands of the operator, and form the handles by which the operator uses the implement.

Handle 6, as shown, assumes a position which is slightly angular with respect to the bar 4, but this is not of the essence of the invention, and it may assume any convenient position. By giving it the angular position shown, it is somewhat more readily grasped by the hand of the operator than it would be in any other position.

The lower handle 7 is given a position more or less nearly parallel to the blade. But this position likewise is not essential; but this handle should be so positioned as to be readily grasped by the other hand of the operator.

The blade 1 is secured to the bars 4 and 5 in any satisfactory way, as by screws or bolts 8, or in any other convenient manner; and the handles 6 and 7, are secured to the bars 4 and 5 by bolts running through the bars 4 and 5; or these parts likewise may be connected in any other suitable way.

It is to be understood that the implement may be made with only one cutting edge, if preferred.

In using the implement the operator grasps one handle 6 with one hand and the handle 7 with the other, and holding the blade directly before him gives the same a swinging stroke, thus effecting the cutting operation.

As explained above, since the bars 4 and 5 maintain an angular position with respect to the blade, the latter will normally stand away from the operator; this arrangement forces the blade to assume a position substantially horizontal to the ground.

It is also desirable that the blade shall not only be horizontal with respect to the ground, but also that it shall stand directly in front of the operator. The handles 6 and 7 are so positioned that the hands of the user naturally hold the cutter in such a manner that the blade 1 stands substantially at right angles to his face. This arrangement, therefore, not only enables the operator to hold the cutting blade in horizontal position, but makes it easy to hold it directly away from him and in the proper cutting position.

Moreover, the use of the two handles 6 and 7 enables the operator to use one or the other of these bars as a pivot, so to speak, upon which to swing the implement in the normal use thereof.

It is to be understood that the invention is not restricted to the exact form and arrangement of parts here disclosed, but minor changes may be made without departing from the spirit of the invention.

What I claim as my invention is:

1. In a cutter, the combination of a cutting blade, supporting bars secured one to either end of the blade, both being secured to the blade at an angle thereto so that they will extend in the same general direction, and handles to be grasped by the hands of the operator arranged near the tops of and between the bars, substantially as described.

2. In a cutter, the combination of blade having a cutting edge, two bars one secured to either end of the cutting blade and bearing such an angular relation thereto that in use the blade will be held away from the operator and in a substantially horizontal position with respect to the ground, a handle connecting the two bars at their upper ends adapted to be held by one hand of the operator, and a second handle secured between the bars and adapted to be grasped by the other hand of the operator, substantially as described.

3. In a cutter, the combination of a cutting blade, a bar secured to the blade at one end thereof and bearing an angular position with respect thereto, a second bar secured to the other end of the blade and having a more acute angular position with respect thereto, a handle secured between the bars at or near the tops thereof and positioned so as to be readily grasped by one of the hands of an operator, and a second handle connected between the bars below the first mentioned handle in a position to be conveniently grasped by the other of the hands of the operator, the two handles being so positioned with respect to the plane of the cutter as to normally hold the cutting blade in the position desired.

In testimony whereof I have hereby affixed my signature.

ELBERT N. WHITMIRE.